June 25, 1957 S. S. SOLOMON 2,796,823
BEVERAGE PREPARATION AND SERVING DEVICE
Filed Feb. 11, 1954
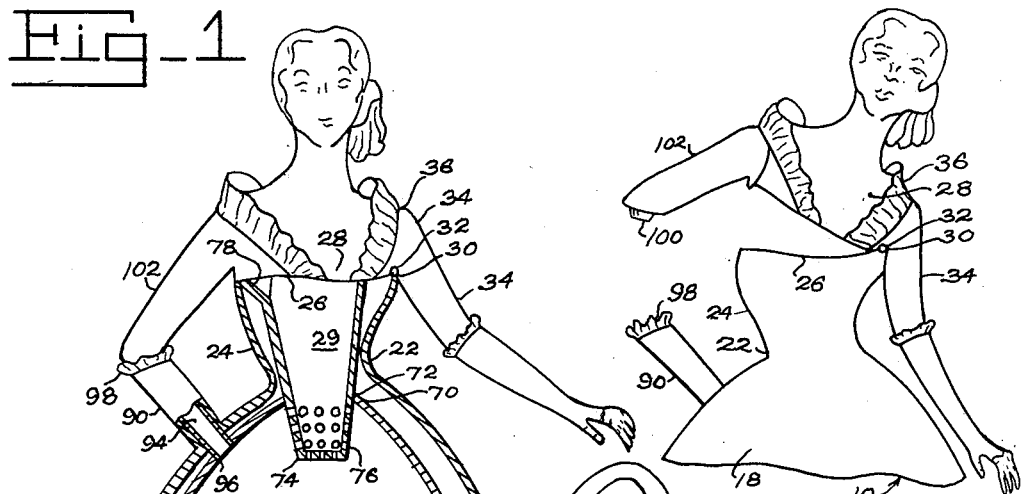
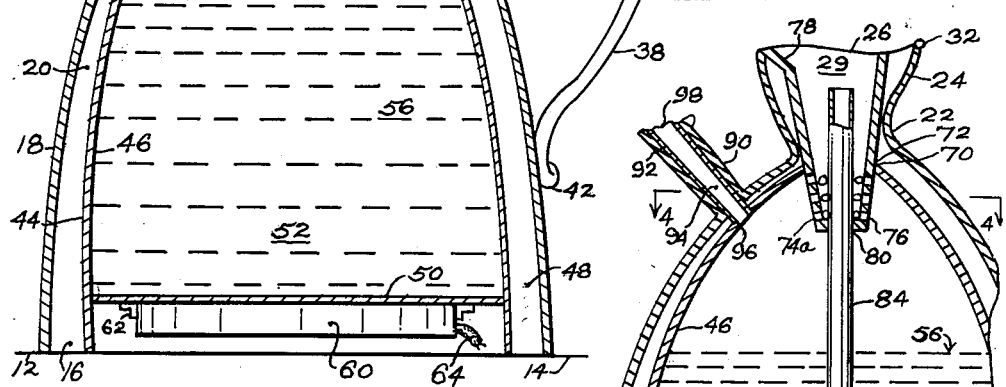
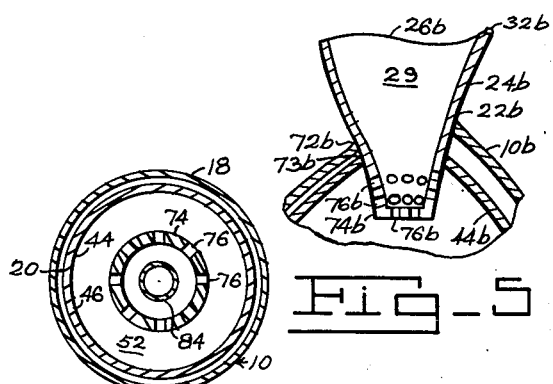
INVENTOR.
Samuel S. Solomon
BY
Peter Fries, Jr.
ATTORNEY

United States Patent Office 2,796,823
Patented June 25, 1957

2,796,823

BEVERAGE PREPARATION AND SERVING DEVICE

Samuel S. Solomon, Brooklyn, N. Y.

Application February 11, 1954, Serial No. 409,663

1 Claim. (Cl. 99—322)

This invention relates to improvements in household articles in the nature of beverage preparation and serving utensils and the like.

An object of the invention is to provide a novel and improved device, of the character described, in which there is a main housing defining an inner main chamber and closed at its upper portion by means of a novel closure, the main chamber being adapted for receiving fluids such as a beverage liquid or the like, which is to be dispensed therefrom.

A further object of the invention is to provide a novel and improved device of the character described, in which there is a main housing having the outward shape, and contours of a lifelike figure or figurine, and defining an inner main chamber open at the top, and extending into the torso or waist portion of the figure, for containing liquid beverage or the like, the upper portion of the figure above the chest portion of the figure being separable and hinged or otherwise secured in removable fashion thereto, to allow opening to expose the interior of the main chamber, for filling the chamber, and/or for pouring its contents out, the construction being such that there is substantially no visible indication on the outside of the figure or figurine that it is a beverage dispensing device, when in closed position.

Another object of the invention is to provide a novel and improved device for the preparation and dispensing of liquid beverages, such as coffee, tea, and the like, and in which there is a main housing having the outward appearance and shape of a lifelike figure or figurine, with the upper portion of the torso or waist being divided substantially on a horizontal plane, and hinged at one side together, so that the user may tilt the upper portion of the torso on said hinge connection, to expose the interior of the main housing, there being a main chamber formed therein to receive liquid beverage, with an upper support casing having apertures and for receiving tea leaves, ground coffee beans, postum powder, instant coffee powder, or the like, to prepare the desired beverage therefrom.

Still another object of the invention is to provide a novel and improved figurine device, with the arms thereof arranged so that at least one forearm extends inwardly into engagement with the body portion of the figurine, the said forearm being divided at the elbow portion and hollow to form a tubular pouring spout leading into the interior chamber of the figurine, and closed at its outlet end by the complementary portion of the said arm when the same is moved into closing position, the upper portion of the figurine being hinged at one side to the waist portion of the body thereof, to carry the closing portion of the arm and also therewith the figurine upper portion, exposing the interior of the chamber for insertion of coffee, tea leaves, powdered instant coffee or the like, into an apertured inner bowl, the bowl being arranged for alternative engagement with a percolator vertical tube and lower water inlet dome, for using the same as a percolator in making coffee.

Still a further object of the invention is to provide a novel and improved combined figurine device and beverage percolator, or tea or other beverage preparation device and server, with closure hinged at the upper portion thereof and simulating the nature of the figurine, the upswinging of the closure exposing the interior of the figurine housing to receive liquid and tea leaves, coffee, or the like, the housing being provided at its lower portion with means for heating the liquid, such as an electrical hotplate carried thereby and connectable to a source of electrical energy, with novel pouring spout means uncovered upon upswinging of the figurine closure.

Another object of the invention is to provide a novel and improved beverage serving and dispensing device of the character described, which is simple in design, inexpensive to manufacture, attractive in appearance, and highly convenient and handy in use.

Still another object of the invention is to provide a novel and improved combined figurine and beverage preparing and dispensing device, which may be made of various materials, such as chinaware, metal, or a combination thereof, and which may be made in various sizes, such as to hold sufficient beverage for one or two cups, or seven or eight cups, depending upon the needs and desires of the purchaser thereof.

These and other objects and advantages of the invention will become apparent from the following description of a preferred embodiment thereof, as illustrated in the accompanying drawings, forming a part thereof, and in which, Figure 1 is a front elevational view showing the device according to the invention, the view being sectioned vertically in part to illustrate the interior construction thereof.

Figure 2 is a fragmentary front elevational view similar to that of Figure 1, but showing the device with the upper torso portion or closure uptilted on the hinged fastening, exposing the pouring spout and the interior of the torso.

Figure 3 is a sectional elevational view similar to that of Figure 1, but showing a modified form of the invention in which there is the percolator tube and associated parts for making percolator coffee therein.

Figure 4 is a sectional plan view taken substantially on plane 4—4 of Figure 3.

Figure 5 is a fragmentary sectional elevational view of a modified form of the invention, in which the bodice is combined with the bowl and is removable from the main housing, the view being shown apart from the upper figurine portion.

In connection with devices such as those used for preparation and serving of beverages, coffee, tea, instant coffee powders, postum, and the like, it is often desired that the device have some other appearance outwardly than the conventional coffee pot or percolator, or tea pot. The present invention provides means whereby a versatile device for the preparation and serving of such beverages has no outward appearance at all remotely resembling the coffee pot or tea pot, but instead is in the form of an attractive figurine which may be disposed in a china closet or the like, or on a mantle piece, without anyone realizing that it is actually used for that purpose also. Further, the construction is such that there is integration of the utilitarian features with the housing in such a manner that there is no interference of one part with the other, and the greatest efficiency results in connection therewith. Furthermore, there is provision for use of a self contained electric hotplate type heating means right in the main housing, so that heat is available for heating the water for preparing the tea, coffee, or the like beverage.

In order to understand clearly the nature of the invention, and the best means for carrying it out, reference may now be had to the drawings, in which like numerals denote similar parts throughout the several views.

As shown, there is a main housing generally indicated at 10, which may be formed of metal, plastic, chinaware, ceramics, or glassware, and is in the contour of a continuously convergent cone-like form, with its base at 12, and thus adapted to rest upon a level surface 14 or the like. The main housing 10 may be downwardly open, as shown, at 16, or may be provided with a bottom wall closing the same. In any event, there is thus defined inside the wall 18 of the main housing, a main chamber 20. The main housing is thus shaped somewhat like a fanciful hoop skirt or gown of a colonial period, and thus has at its upper portion an inwardly shaped waist area at 22 simulating the waist portion of the dress of the figure shown, and then expands smoothly thereabove, as at 24 so as to simulate the bust or bodice portion of the dress and the figure illustrated. The lower portion of the device thus extends upwardly to the location 26, which may be either planar when viewed in elevation, or may be curved somewhat, to obscure the line of division thereat. As shown, the figure or figurine has its upper chest portion 28 secured at one edge or side 30 by means of a hinge 32 disposed right in the armpit portion, so that it is substantially concealed at the junction of the right arm of the figure as seen at 34, with the shoulder 36.

A handle 38 is secured at 40 and 42 to the side surface of the wall 18 of the main housing, so as to permit the user to lift up the entire assembly for handling or pouring, or for other purposes as needed. Inside the main outer housing chamber 20 is disposed an inner liner or casing 44, which may have its side wall 46 shaped similarly to that of the outer housing 10, but of somewhat smaller diameter so as to fit easily therein without direct contact along most of its area, thus forming an annular interspace 48 therebetween, for insulating against heat transfer from the hot inner casing to the outer housing 10.

At the bottom, there is a wall or floor 50 which closes the chamber 52 of the inner casing, and thus permits it to contain liquids 56 or the like when desired, without leaking. The liquid 56, which may be water, coffee, tea, or other beverage, is heated by means of an attached electric hotplate heater 60 secured thereto in any suitable manner, as by brackets 62, and is connectable by electric wires 64 to a source of electric power, electrical outlet, or the like. It is seen that there is spacing between the heater 60 and the plane 14, to prevent heating of the supporting surface, and, if desired, an insulating wall of asbestos or the like may be carried therebetween also.

At the top end 70, there is an opening 72 in the inner casing 44, to permit seating snugly the brewing bowl 74 which is generally frusto conical in shape. The bowl 74 may be made of metal, ceramics, glass or the like, and has apertures 76 formed therein to permit liquids to drain therethrough. The holes 76 are small enough to block passage of coffee grounds, tea leaves, and the like, preferably. At the upper end there is formed a spout or pouring lip 78 to facilitate pouring off any liquids therefrom, and it may be formed with a central opening 80 into which a plug 82 may fit, and which is removable as seen in Figure 3, to permit the insertion of the tube 84 of a percolator assembly. At the lower end of the tube 84 is a dome 86 which may be apertured as at 88 to allow free entry of steam and liquid during the percolation process.

As seen in Figures 1, 2 and 3, as shown, the forearm 90 of the figurine has an axial bore 92 formed therethrough to allow the insertion of the pouring spout tube 94, the inner end of tube 94 being secured in an opening 96 formed through the wall of the inner casing 46. Since the outer end 98 of the said forearm 90 is open, it is seen that when the arm 34 of the figurine is depressed, as in Figure 2, the plug 100 carried on the upper arm portion 102 is lifted upwards, uncovering the opening 98, and permitting the user to pour off some coffee, tea, or the like through opening 98.

It is thus apparent that I have disclosed a novel and useful device which, when in use is of the utmost convenience, and when not in use is highly decorative and attractive. When standing there on a shelf, table or stand, there is no thought that there is anything there than a figurine of attractive contours, but when suddenly brought into use, it is obvious that considerable utility is brought into play. It can be made of a variety of materials, and in colors, and thus suit any decorative motif.

The dome 86 of Figure 3 is made sufficiently small as to easily pass through the opening 72 for removal or insertion thereof. The heater 60 may be omitted, according to a modified form of the invention, and the heat supplied from a stove, or hot water may be prepared elsewhere and poured into the chamber. The figure shown is illustrative only, and may be a modern one with modern costume, or may be some form such as an animal-like figure, if desired, according to another modified form. The device can also be used as a decanter for wine or other liquors or liquor beverages, and used as a cocktail shaker if desired, the bowl being removed where needed. It is seen that the long spout 90 permits pouring out of the beverage without soiling or wetting the housing 10.

Referring to Figure 5, it is seen that here is a modified form of the invention, in which the bodice and bowl are combined in one unit 24b, tapering downwards at the waist 22b, for insertion through the openings 72b and 73b of the housings 10b and 44b, which correspond to the housing 10 and 44 of Figure 1. The fit may be enhanced by means of suitable gaskets or the like, not shown. As seen, the bowl-bodice 24b has apertures 76b formed therein to allow coffee to be made therein in the usual dripolator manner, or tea, by placing tea or coffee in the bowl chamber 29. Figure 5 does not show the upper portion 28 of the figurine in position, it being omitted for clarity only, and will be used in the same manner as for Figures 1 and 2.

Although I have described my invention in specific terms, it will be understood that various changes may be made in size, shape, materials and arrangement without departing from the spirit and scope of the invention as claimed.

I claim:

A combination beverage serving and preparation device comprising a hollow figurine in the form of a lifelike human female figure with enlarged skirt portion, and defining a first main chamber therein, said figurine comprising a bodice, chest portion and a hollow arm, with forearm and upper arm portions, an inner casing disposed in said main chamber and defining therewithin an inner chamber for the reception of liquid, heater means engaging said inner casing for heating said liquid therein, said inner chamber being upwardly open, bowl means carried in the upper end of said inner chamber, and being apertured to receive coffee grounds, tea leaves and the like, but blocking egress thereof therethrough, the chest portion of the figurine being hingedly separable from the bodice thereof, to expose the bowl, said forearm of said figurine extending against the side of said skirt portion, and forming a hollow spout communicating with the interior of the inner chamber to permit pouring beverage therefrom, the arm upper portion being simultaneously separable from said forearm so as to expose the pouring spout dispensing end when the chest of the figurine is uplifted.

(References on following page)

References Cited in the file of this patent

UNITED STATES PATENTS

| | | |
|---|---|---|
| 238,052 | Ricker et al. | Feb. 22, 1881 |
| 673,371 | Thorp | Apr. 30, 1901 |
| 772,481 | Talbert | Oct. 18, 1904 |
| 1,149,840 | Lange | Aug. 10, 1915 |
| 1,210,892 | Borchmann | Jan. 2, 1917 |
| 1,722,696 | Fowler | July 30, 1929 |
| 1,987,892 | Duevel et al. | Jan. 15, 1935 |
| 2,093,980 | Linger | Sept. 21, 1937 |
| 2,190,522 | Pagliuco | Feb. 13, 1940 |

FOREIGN PATENTS

| | | |
|---|---|---|
| 171,558 | Great Britain | Nov. 24, 1921 |
| 272,699 | Great Britain | June 23, 1927 |
| 473,489 | Germany | Mar. 15, 1929 |